(12) United States Patent
Ishiguro et al.

(10) Patent No.: US 6,984,059 B2
(45) Date of Patent: Jan. 10, 2006

(54) VEHICULAR HEADLIGHT AXIS CONTROL DEVICE

(75) Inventors: Koji Ishiguro, Toyoake (JP); Kenichi Nishimura, Gifu (JP); Toshio Sugimoto, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/771,318

(22) Filed: Feb. 5, 2004

(65) Prior Publication Data

US 2004/0160759 A1    Aug. 19, 2004

(30) Foreign Application Priority Data

Feb. 17, 2003  (JP)  .............................. 2003-038095
Oct. 29, 2003  (JP)  .............................. 2003-369192

(51) Int. Cl.
B60Q 1/00       (2006.01)
G06F 15/00      (2006.01)

(52) U.S. Cl. ...................................... 362/465; 702/151
(58) Field of Classification Search ................ 362/464, 362/465, 466, 42, 43, 44, 46, 49; 702/94, 702/95, 151, 189, 197
See application file for complete search history.

(56) References Cited

U.S. PATENT DOCUMENTS

| 6,634,773 B2 * | 10/2003 | Hayami ...................... 362/464 |
| 6,671,640 B2 * | 12/2003 | Okuchi et al. ................ 702/95 |
| 6,755,560 B2 * | 6/2004 | Horii .......................... 362/466 |
| 2004/0001331 A1 * | 1/2004 | Sugimoto et al. ............. 362/44 |

FOREIGN PATENT DOCUMENTS

| JP | 64-74133 | 3/1989 |
| JP | 3-14742 | 1/1991 |
| JP | 8-301005 | 11/1996 |
| JP | 9-11792 | 1/1997 |
| JP | 2002-178829 | 6/2002 |

* cited by examiner

Primary Examiner—Wilson Lee
Assistant Examiner—Minh Dieu A
(74) Attorney, Agent, or Firm—Nixon & Vanderhye P.C.

(57) ABSTRACT

A steering angle detected by a steering angle sensor is filtered to be used for changing a responsiveness of controlling an axis orientation of headlights of a vehicle. Based on the filtered steering angle, the axis orientations of the headlights are thereby controlled for being laterally swiveled. This leads to relieving a driver from being bothered by a feeling of strangeness irrespective of a state where the vehicle is rectilinearly traveling or turning around a curve, resulting in providing preferable swivel control meeting driver's sensibility.

34 Claims, 2 Drawing Sheets

VEHICULAR HEADLIGHT AXIS CONTROL DEVICE

CROSS REFERENCE TO RELATED APPLICATIONS

This application is based on and incorporates herein by reference Japanese Patent Applications No. 2003-38095 filed on Feb. 17, 2003 and No. 2003-369192 filed on Oct. 29, 2003.

FIELD OF THE INVENTION

The present invention relates to a vehicular headlight axis control device that is capable of automatically controlling, according to a steering angle of a steering wheel, orientations of left and right headlights provided in a vehicle.

BACKGROUND OF THE INVENTION

Conventional vehicular headlight axis control devices are disclosed in JP-A-H3-14742, JP-A-S64-74133, JP-A-H8-301005, and JP-A-2002-178829.

In JP-A-H3-14742, an irradiation angle of a headlight is appropriately set based on a control map corresponding to a setting position of a steering wheel.

In JP-A-S64-74133, of a headlight (lighting means), an irradiation orientation changing operation interlocked with steering of a steering wheel is suppressed within a given steering angle with respect to a steering position in rectilinear traveling of a vehicle.

In JP-A-H8-301005, when an irradiation angle of a headlight is interlocked with a steering angle, a changing rate of irradiation angle to the steering angle is controlled so as to become small or large in an area where the steering angle is small or large, respectively. Here, an angle variation of the headlight with respect to a steering variation can be decreased during the rectilinear traveling, resulting in prevention of troublesomeness. Further, when a vehicle turns around a curve, a traveling direction can be irradiated according to steering of a steering wheel. It is described that this leads to obtaining preferable visibility and results in preventing a driver from being bothered by a feeling of strangeness.

In JP-A-2002-178829, when an irradiation axis of a headlight is controlled for being swiveled based on a change rate of a steering angle of a steering wheel, its responsiveness can be changed so as to preventing a driver from being bothered by a feeling of strangeness.

The above disclosure can be effective in a change of a steering angle due to sway of a steering wheel during the rectilinear traveling of a vehicle. However, it cannot be responsive to sway of the steering wheel during the turning of the vehicle, still involving not a little feeling of strangeness of a driver.

SUMMARY OF THE INVENTION

It is an object of the present invention to provide a vehicular headlight axis control device that is capable of decreasing a feeling of strangeness for a driver while automatically controlling, according to a steering angle of a steering wheel, an axis orientation of a headlight.

To achieve the above object, a headlight axis control device in a vehicle is provided with the following. A steering angle of a steering wheel is detected and filtered for changing responsiveness in controlling an orientation of a headlight axis. The orientation of the headlight axis is then swiveled based on the filtered steering angle. This results in providing preferable swivel control of the headlight axis orientation meeting driver's sensibility, irrespective of a state where a vehicle is rectilinearly traveling or turning around a curve.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
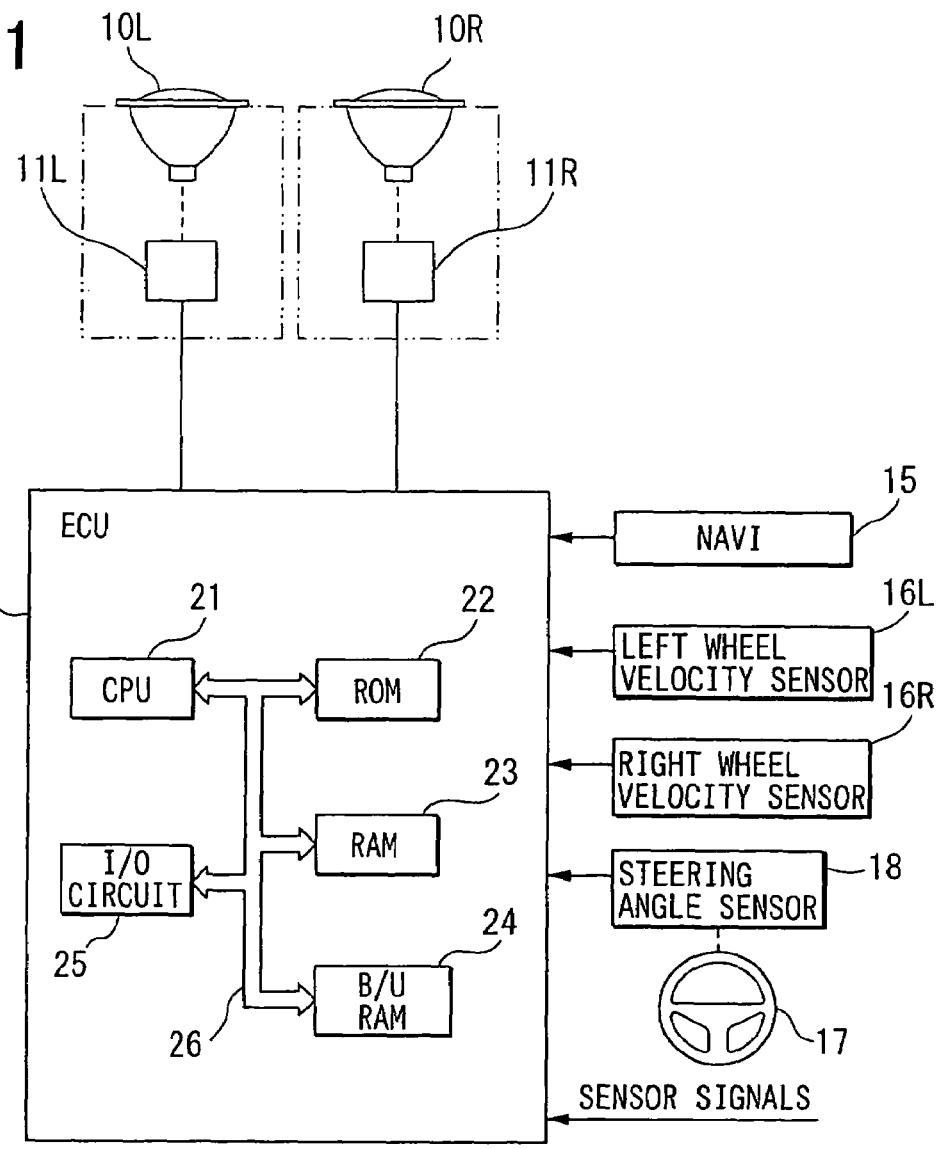
FIG. 1 is a diagram of an overall structure of a vehicular headlight axis control device according to an embodiment of the present invention.

An overall structure of a vehicular headlight axis control device according to an embodiment of the present invention is shown in FIG. 1. A left and right headlights 10L, 10R are provided in a front surface of a vehicle, being connected with actuators 11L, 11R used for controlling a light axis orientation (or irradiation orientation). An ECU (Electronic Control Unit) 20 is provided as a logical operation circuit, including: a known CPU 21 of a central control unit for executing various processing; a ROM 22 for storing a control program, a control map, etc.; a RAM 23 for storing various data; a B/U (Back-Up) RAM 24; an I/O circuit 25; a bus line intermediating between the preceding components; or the like.

The ECU 20 receives signals from outside units as follows: a known in-vehicle navigation system 15; a left wheel velocity sensor 16L for detecting a left wheel velocity VL; a right wheel velocity sensor 16R for detecting a right wheel velocity VR; a steering angle sensor 18 for detecting a steering angle STRA of a steering wheel 17 operated by a driver; and other sensors. The ECU 20 outputs signals to control axis orientations of the left and right headlights 10L, 10R via the left and right actuators 11L, 11R, respectively.

Figure 2:
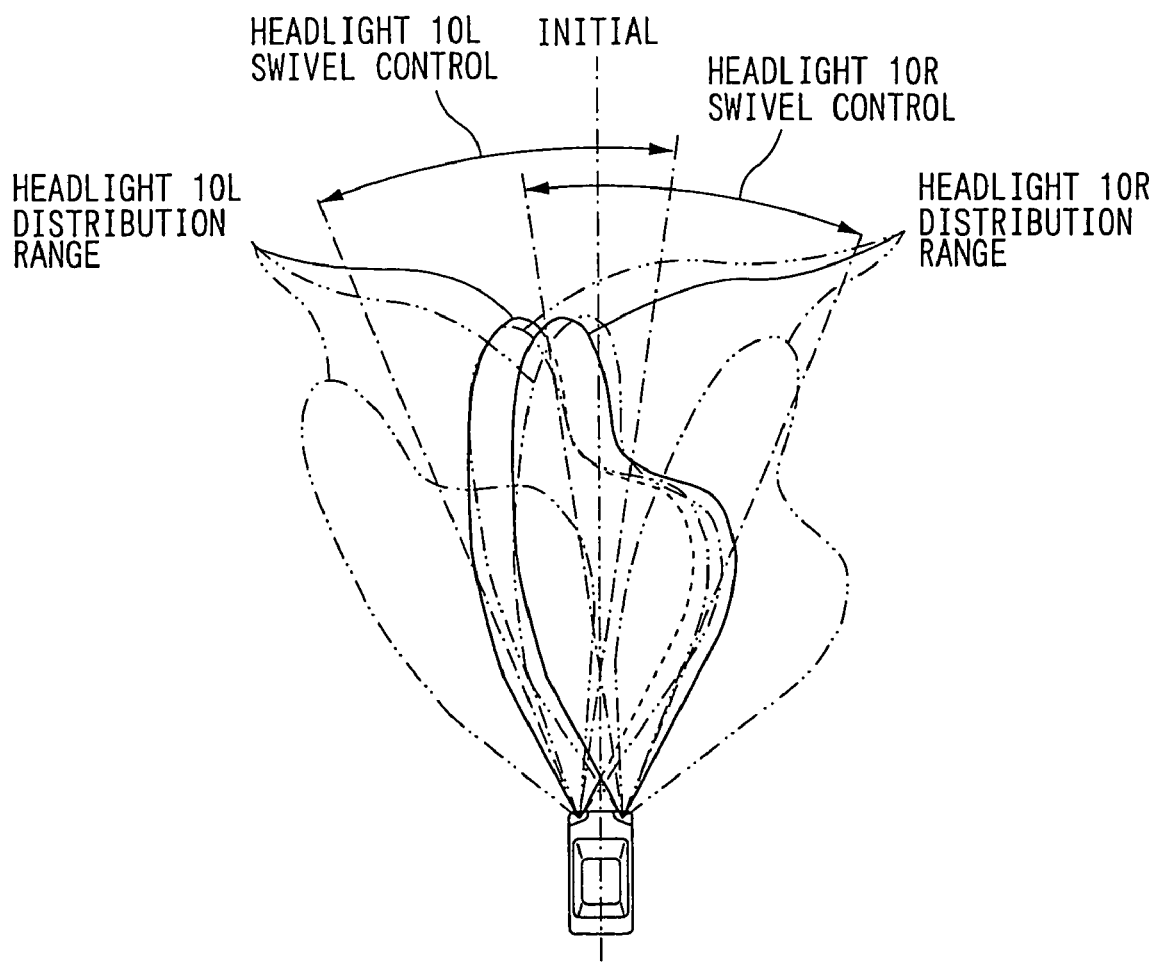
FIG. 2 is a view showing headlight distribution ranges of the vehicular headlight axis control device according to the embodiment.

In this embodiment, as shown in FIG. 2, distribution ranges (of low beams) of the headlights 10L, 10R are adjusted within a lateral (leftward or rightward) swivel control range from an initial position according to leftward or rightward steering from a central position of a steering wheel 17. This swivel control range is designed so as not to reduce forward visibility of a driver and further so as to obtain leftward or rightward visibility pertinent to leftward or rightward steering of a steering wheel 17 by a driver. Therefore, in rightward swivel due to rightward steering of a steering wheel 17, a rightward distribution range within all the distribution range of the right headlight 10R is broader than a rightward distribution range within all the distribution range of the left headlight 10L. By contrast, in leftward swivel due to leftward steering of the steering wheel 17, a leftward distribution range within all the distribution range of the right headlight 10R is narrower than a leftward distribution range within all the distribution range of the left headlight 10L.

Next, processing of setting a filter constant β used in the headlight axis control device will be explained with reference to FIG. 3. Setting the filter constant β is executed by the CPU 21 of the ECU 20, being repeated as a routine every approximately 50 milli-seconds [ms]. Here, an angle variation per time unit of a steering angle STRA detected by the steering angle sensor 18 refers to a steering angle velocity ω [degree/sec].

At Step 101, it is determined whether a steering angle velocity ω is a given value α or more. This given value α is set within a range between 20 and 60 [degree/sec], being preferably set within a range between 30 and 40 [degree/sec]. Here, when the steering angle velocity ω is determined to be the given value α or more, it is determined that the vehicle is in the middle of entering a curve or exiting from a curve. The processing thereby proceeds to Step 102, where a filter constant β is set to "1." The routine is then terminated.

Setting a filter constant to "1" causes a post-filtering steering angle STA(j) to thoroughly (100%) depend on a pre-filtering steering angle STRA(j). Here, while a pre-filtering (or real) steering angle STRA refers to a steering angle STRA detected by the steering angle sensor 18, a post-filtering steering angle STA refers to a steering angle that is a result of filtering treatment applied to a pre-filtering steering angle STRA. Further, affix j refers to "present or this time."

Namely, setting a filter constant to "1" means that the pre-filtering steering angle STRA(j) is not filtered, enabling quick responsiveness of the swivel control for adjusting the axis orientations of the right and left headlights 10L, 10R.

By contrast, at Step 101, when the determination is negated, it is determined that the vehicle is rectilinearly traveling or turning around a curve. The processing thereby proceeds to Step 103, where the filter constant β is set within a range between "0.01" and "0.5." The routine is then terminated.

Based on the filter constant β set to within the range between "0.01" and "0.5," a post-filtering steering angle STRA(j) is computed using a formula (1) below.

$$STA(j)=\beta \times STRA(j)+(1-\beta)\times STA(j-1) \quad (1)$$

Here, while affix j refers to "present or this time," affix j−1 refers to "previous time."

Suppose that a vehicle is rectilinearly traveling or turning around a curve. Here, a present post-filtering steering angle STA(j) is obtained from the addition, using the respective given ratios based on the filter constant β, of the previous post-filtering steering angle STA(j−1) and this-time pre-filtering real steering angle STRA(j) detected by the steering angle sensor 18. This thereby provides moderate responsiveness in the swivel control for adjusting the axis orientations of the headlights 10L, 10R.

Figure 4:
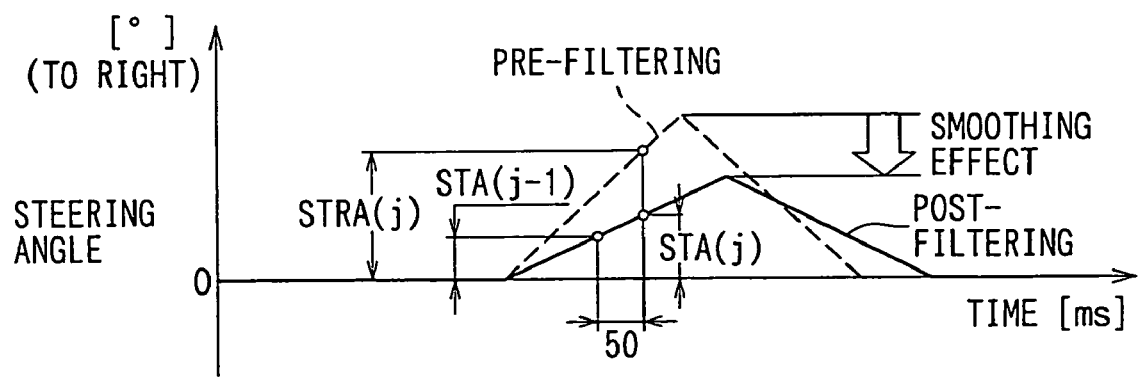
FIG. 4 is a time chart diagram schematically showing a pre-filtering and post-filtering steering angles.

Next, a relationship between a pre-filtering steering angle STRA(j) and a post-filtering steering angle STA(j) will be explained with reference to FIG. 4. In FIG. 4, a state is enlarged where a steering wheel 17 instantaneously sways rightward so that a steering angle STRA sways rightward in a moment.

Suppose that at Step 101 a steering angle velocity ω is determined to be less than a given value a and that the vehicle is determined to be rectilinearly traveling or turning around a curve. Here, as the filter constant β is thereby set to within a range between "0.01" and "0.5," the axis orientations of the headlights 10L, 10R are adjusted through a swivel control using a post-filtering steering angle STA(j) obtained from the formula (1).

As a result, as shown in FIG. 4, a post-filtering rightward steering angle STA(j) (solid line) is decreased or smoothed from a pre-filtering steering angle STRA(j) by a smoothing effect (hollow arrow). Rightward sway of the headlight axis orientation is thereby suppressed so as to become moderate and small. Namely, determination of rectilinear traveling or turning around a curve executes the filtering treatment, posterior to which swivel control is performed using a post-filtering steering angle STA(j). This enables the axis orientations of the headlights 10L, 10R to be adjusted with moderate responsiveness, leading to meeting driver's sensibility.

Here, the responsiveness more preferably meets the driver's sensibility when the given value α falls within a range between 30 and 40 [degree/sec] or the filter constant β falls within a range between "0.025" and "0.2."

By contrast, suppose that at Step 101 a steering angle velocity ω is determined to be not less than a given value α and that the vehicle is determined to be in the middle of entering a curve or exiting from a curve. Here, as the filter constant β is thereby set to "1," no filtering treatment is executed.

As a result, as shown in FIG. 4, a pre-filtering rightward steering angle STRA(j) (solid line) is directly used as a post-filtering steering angle STA(j). The swivel control using this-time steering angle STRA(j) executes so as to obtain quick responsiveness of adjusting the axis orientations of the headlights 10L, 10R. This enables the axis orientations of the headlights 10L, 10R to be adjusted with quick responsiveness, leading to corresponding to behavior of a steering angle in the middle of entering a curve or exiting from a curve.

As explained above, a vehicular headlight axis control device according to this embodiment includes a steering angle sensor 18 as steering angle detecting means, filtering means achieved by the ECU 20, and swivel control means achieved by the ECU 20 and actuators 11L, 11R. Here, the steering angle detecting means detects a steering angle STRA of a steering wheel of a vehicle. The filtering means filters the detected steering angle STRA by the steering angle sensor 18 for changing responsiveness of adjusting axis orientations of the headlights 10L, 10R. The swivel control means laterally (leftward or rightward) swivels the axis orientations of the headlights 10L, 10R based on the filtered steering angle by the filtering means.

Namely, filtering treatment is applied to the steering angle STRA detected by the steering angle sensor 18 for changing a degree of responsiveness of adjusting the axis orientations of the headlights 10L, 10R of the vehicle. Based on this post-filtering steering angle, the axis orientations of the real headlights 10L, 10R are controlled for being laterally leftward or rightward swiveled. The filtering treatment is applied to behavior of the steering angle STRA detected by the steering angle sensor 18 for the headlights 10L, 10R to be then adjusted. This leads to suppressing a feeling of strangeness of a driver regardless of a time period of rectilinear traveling or turning around a curve, developing preferable swivel control meeting the driver's sensibility.

Further, the filtering means sets a post-filtering steering angle STA(j) by the above-mentioned formula (1) using a this-time steering angle STRA(j), a previous post-filtering steering angle STA(j−1), and a filter constant β. Here, the filter constant β is set within a range between "0.01" and "0.5," or preferably within a range between "0.025" and "0.2."

Based on this post-filtering steering angle STA(j), the axis orientations of the headlights 10L, 10R can be controlled through the swivel control for being appropriately adjusted to correspond to behavior of the steering angle STRA of the steering wheel 17 detected by the steering angle sensor 18. Here, setting the filter constant β within a range between "0.01" and "0.5," or preferably within a range between "0.025" and "0.2" enables the axis orientations of the headlights 10L, 10R due to the swivel control to meet the driver's sensibility.

Furthermore, the light axis control device of this embodiment includes swivel determining means achieved by the ECU 20. The swivel determining means determines that a vehicle is in the middle of entering a curve or exiting from a curve when a steering angle velocity ω is a given value a or more. Here, the steering angle velocity ω is an angle variation per time unit of the steering angle STRA detected by the steering angle sensor 18. When the vehicle is determined to be in the middle of entering a curve or exiting from a curve, the filtering means applies no filtering treatment to the steering angle STRA detected by the steering angle sensor 18. Here, the given value α is set within a range between 20 and 60 [degree/sec], preferably within a range between 30 and 40 [degree/sec].

As explained above, when the steering angle velocity ω is determined to be the given value α or more, the vehicle is determined to be in the middle of entering a curve or exiting from a curve. Here, no filtering treatment is applied to the steering angle STRA detected by the steering angle sensor 18. This enables the swivel control while the vehicle is in the middle of entering a curve or exiting from a curve not to delay, resulting in decreasing a feeling of strangeness of a driver. Here, setting the given value α within a range between 20 and 60 [degree/sec], preferably within a range between 30 and 40 [degree/sec] enables determination of the vehicle's state such as rectilinearly traveling, turning around a curve, or being in the middle of entering a curve or exiting a curve to be more accurately executed pertinent to behavior of the steering angle of the steering wheel 17 detected by the steering angle sensor 18.

(Modification)

In the above embodiment, although the swivel control is applied to the headlights 10L, 10R as head lamps, the swivel control can be applied to others such as lights for swiveling disposed separately from the headlights 10L, 10R. Furthermore, the swivel control can be applied to both the headlights and lights for swiveling.

Further, in the above embodiment, whether a vehicle is in the middle of entering a curve or exiting from a curve is determined based on a steering angle velocity ω. However, the steering angle velocity ω as a determination basis can be replaced with: intersection information from a navigation system 15; a difference in an output signal between a left wheel velocity sensor 16L and a right wheel velocity sensor 16R; an output signal from a yaw rate sensor for detecting swiveling state of a vehicle; an output signal from a lateral G sensor for detecting lateral gravitational acceleration, etc.

Figure 3:
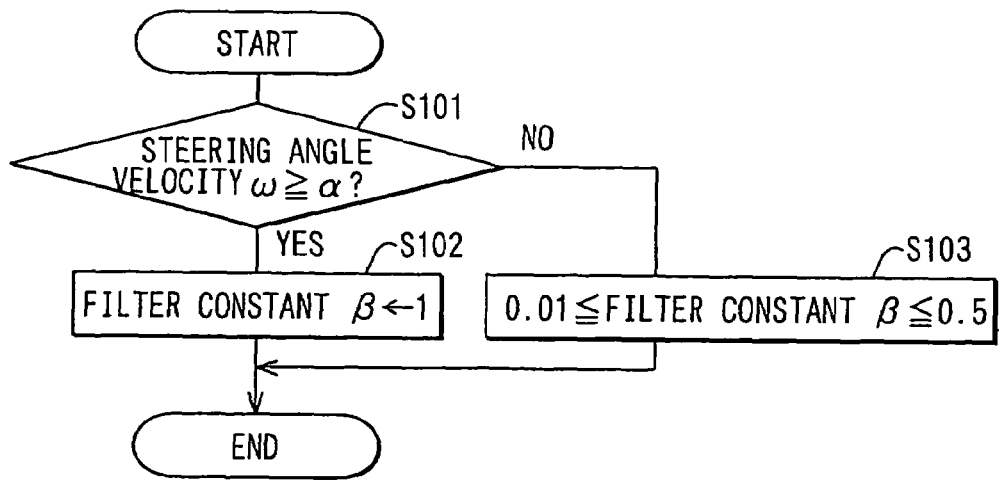
FIG. 3 is a flowchart diagram explaining processing of setting a filter constant in the vehicular headlight axis control device according to the embodiment.

Furthermore, in addition, in the above embodiment, when at Step 101 in FIG. 3 a steering angle velocity ω is determined to be a given value α or more, it is determined that the vehicle is in the middle of entering a curve or exiting from a curve. Here, a filter constant β is thereby set to "1," leading to removing the filtering treatment. This is designed to give a priority to quick responsiveness. However, it can be another option based on a vehicle's type or a user level. For instance, in this case, instead of no filtering treatment, a less-responsive filter can be available that slows down the responsiveness less or much less than a typical filter used for filtering a steering angle. For instance, a filter constant β can be set to less than "1" and more than "0.5," instead of "1."

The just-above mentioned vehicular headlight axis control device includes swivel determining means and filtering means, both of which are achieved by the ECU 20. The swivel determining means determines that a vehicle is in the middle of entering a curve or exiting from a curve when a steering angle velocity ω is a given value α or more. When the vehicle is determined to be in the middle of entering a curve or exiting from a curve, the filtering means then applies less-responsive (weak) filtering treatment to the steering angle STRA detected by the steering angle sensor 18. This enables the swivel control, while the vehicle is in the middle of entering a curve or exiting from a curve, to quicken a little more than while the vehicle is rectilinearly traveling or turning around a curve, resulting in decreasing a feeling of strangeness of a driver.

Here, the filtering means sets a post-filtering steering angle STA(j) by the above-mentioned formula (1) using a this-time steering angle STRA(j), a previous post-filtering steering angle STA(j−1), and a filter constant β. The filter constant β is set to less than "1" and more than "0.5." This enables the axis orientations of the headlights 10L, 10R to be adjusted using the responsiveness by the swivel control reflecting a vehicle type or a user level, leading to detailed adjustment so as to meet the driver's sensibility.

Here, also setting the given value a within a range between 20 and 60 [degree/sec], preferably within a range between 30 and 40 [degree/sec] enables determination of the vehicle's state such as rectilinearly traveling, turning around a curve, or being in the middle of entering a curve or exiting a curve to be more accurately executed pertinent to behavior of the steering angle of the steering wheel 17 detected by the steering angle sensor 18.

It will be obvious to those skilled in the art that various changes may be made in the above-described embodiments of the present invention. However, the scope of the present invention should be determined by the following claims.

What is claimed is:

1. A headlight axis control device for controlling orientation of a vehicle headlight axis, said device comprising:
   steering angle detecting means for detecting a vehicle steering wheel angle;
   filtering means for changing responsiveness in controlling the orientation of the headlight axis by filtering the detected vehicle steering wheel angle;
   swivel control means for laterally swiveling the orientation of the headlight axis based on the filtered vehicle steering wheel angle;
   wherein a presently detected steering angle by the steering angle detecting means refers to a present pre-filtering steering angle (STRA(j)), a presently filtered steering angle by the filtering means refers to a present post-filtering steering angle (STA(j)), and a previously filtered steering angle by the filtering means refers to a previous post-filtering steering angle (STA(j−1));
   wherein the present post-filtering steering angle STA(j) is specified using a filter constant (β) with a formula where STA(j)=β×STRA(j)+(1−β)×STA(j−1); and
   wherein the swivel control means laterally swivels the orientation of the headlight axis based on the present post-filtering steering angle (STA(j)).

2. The headlight axis control device of claim 1,
wherein the filter constant ($\beta$) is set within a range between 0.01 and 0.5.

3. The headlight axis control device of claim 1,
wherein the filter constant ($\beta$) is set within a range between 0.025 and 0.2.

4. The headlight axis control device of claim 1, further comprising:
swivel determining means for determining that the vehicle is in a middle of one of (a) entering a curve and (b) exiting from a curve when an angle variation per unit time of the detected steering angle is not less than a given value,
wherein, when the swivel determining means determines that the vehicle is in the middle of entering the curve or exiting from the curve, the filtering means lets through, without filtering, the steering angle detected by the steering angle detecting means.

5. The headlight axis control device of claim 4,
wherein the given value is set within a range between 20 and 60 degrees per second.

6. The headlight axis control device of claim 4,
wherein the given value is set within a range between 30 and 40 degrees per second.

7. The headlight axis control device of claim 1, further comprising:
swivel determining means for determining that the vehicle is in a middle of one of (a) entering a curve and (b) exiting from a curve when an angle variation per unit time of the detected steering angle is not less than a given value,
wherein, when the swivel determining means determines that the vehicle is not in the middle of entering the curve or exiting from the curve, the filtering means filters the steering angle detected by the steering angle detecting means using a given filter,
wherein, when the swivel determining means determines that the vehicle is in the middle of entering the curve or exiting from the curve, the filtering means filters the steering angle detected by the steering angle detecting means using a certain filter, and
wherein using the certain filter enables responsiveness to be less slowed than using the given filter.

8. The headlight axis control device of claim 7,
wherein the filter constant ($\beta$) is set within a range of more than 0.5 and less than 1.0.

9. The headlight axis control device of claim 7, wherein the given value is set within a range between 20 and 60 degrees per second.

10. The headlight axis control device of claim 7,
wherein the given value is set within a range between 30 and 40 degrees per second.

11. A headlight axis control device for controlling orientation of a vehicle headlight axis, said device comprising:
steering angle detecting means for detecting a vehicle steering wheel angle;
filtering means for changing responsiveness in controlling the orientation of the headlight axis by filtering the detected vehicle steering wheel angle;
swivel control means for laterally swiveling the orientation of the headlight axis based on the filtered vehicle steering angle; and
swivel determining means for determining that the vehicle is in a middle of one of (a) entering a curve and (b) exiting from a curve when an angle variation per unit time of the detected steering angle is not less than a given value,
wherein, when the swivel determining means determines that the vehicle is in the middle of entering the curve or exiting from the curve, the filtering means lets through, without filtering, the steering angle detected by the steering angle detecting means.

12. The headlight axis control device of claim 11,
wherein the given value is set with a range between 20 and 60 degrees per second.

13. The headlight axis control device of claim 11,
wherein the given value is set within a range between 30 and 40 degrees per second.

14. A headlight axis control device for controlling orientation of a vehicle headlight axis, said device comprising:
steering angle detecting means for detecting a vehicle steering wheel angle;
filtering means for changing responsiveness in controlling the orientation of the headlight axis by filtering the detected vehicle steering wheel angle;
swivel control means for laterally swiveling the orientation of the headlight axis based on the filtered vehicle steering angle; and
swivel determining means for determining that the vehicle is in a middle of one of (a) entering a curve and (b) exiting from a curve when an angle variation per unit time of the detected steering angle is not less than a given value,
wherein, when the swivel determining means determines that the vehicle is not in the middle of entering the curve, or exiting from the curve, the filtering means filters the detected vehicle steering angle using a given filter,
wherein, when the swivel determining means determines that the vehicle is in the middle of entering the curve or exiting from the curve, the filtering means filters the detected vehicle steering angle using a certain filter, and
wherein using the certain filter enables responsiveness to be less slowed than using the given filter.

15. The headlight axis control device of claim 14:
wherein a presently detected steering angle by the steering angle detecting means refers to a present pre-filtering steering angle (STRA(j)), a presently filtered steering angle by the filtering means refers to a present post-filtering steering angle (STA(j)), and a previously filtered steering angle by the filtering means refers to a previous post-filtering steering angle (STA(j−1)),
wherein the present post-filtering steering angle STA(j) is specified using a filter constant ($\beta$) with a formula where STA(j)=$\beta$×STRA(j))+(1−$\beta$)×STA(j−1),
wherein the swivel control means laterally swivels the orientation of the headlight axis based on the present post-filtering steering angle (STA(j)), and
wherein the filter constant ($\beta$) is set within a range of more than 0.5 and less than 1.0.

16. The headlight axis control device of claim 14:
wherein the given value is set within a range between 20 and 60 degrees per second.

17. The headlight axis control device of claim 14:
wherein the given value is set within a range between 30 and 40 degrees per second.

18. A method for controlling orientation of a vehicle headlight axis, said method comprising:
detecting a vehicle steering wheel angle;
changing responsiveness in controlling the orientation of the headlight axis by filtering the detected vehicle steering wheel angle;

laterally swiveling the orientation of the headlight axis based on the filtered vehicle steering wheel angle;

wherein a presently detected steering angle refers to a present pre-filtering steering angle (STRA(j)), a presently filtered steering angle refers to a present post-filtering steering angle (STA(j)), and a previously filtered steering angle refers to a previous post-filtering steering angle (STA(j−1));

wherein the present post-filtering steering angle STA(j) is specified using a filter constant (β) with a formula where STA(j)=β×STRA(j))+(1−β)×STA(j−1), and wherein the orientation of the headlight axis is laterally swiveled based on the present post-filtering steering angle (STA(j)).

19. A method as in claim 18 wherein the filter constant (β) is set within a range between 0.01 and 0.5.

20. A method as in claim 18 wherein the filter constant (β) is set within a range between 0.025 and 0.2.

21. A method as in claim 18 further comprising:
determining that the vehicle is in a middle of one of (a) entering a curve and (b) exiting from a curve when an angle variation per unit time of the detected steering angle is not less than a given value,
wherein, when it is determined that the vehicle is in the middle of entering the curve or exiting from the curve, the detected steering angle is not filtered.

22. A method as in claim 21,
wherein the given value is set within a range between 20 and 60 degrees per second.

23. A method as in claim 21
wherein the given value is set within a range between 30 and 40 degrees per second.

24. A method as in claim 18 further comprising:
determining that the vehicle is in a middle of one of (a) entering a curve and (b) exiting from a curve when an angle variation per unit time of the detected steering angle is not less than a given value,
wherein, it is determined that the vehicle is not in the middle of entering the curve or exiting from the curve, the detected steering angle is filtered using a given filter,
wherein, when it is determined that the vehicle is in the middle of entering the curve or exiting from the curve, the detected steering angle is filtered using a certain filter, and
wherein using the certain filter enables responsiveness to be less slowed than using the given filter.

25. A method as in claim 24
wherein the filter constant (β) is set within a range of more than 0.5 and less than 1.0.

26. A method as in claim 24
wherein the given value is set within a range between 20 and 60 degrees per second.

27. A method as in claim 24
wherein the given value is set within a range between 30 and 40 degrees per second.

28. A method for controlling orientation of a vehicle headlight axis, said method comprising:
detecting a vehicle steering wheel angle;
changing responsiveness in controlling the orientation of the headlight axis by filtering the detected vehicle steering wheel angle;
laterally swiveling the orientation of the headlight axis based on the filtered vehicle angle; and
determining that the vehicle is in a middle of one of (a) entering a curve and (b) exiting from a curve when an angle variation per unit time of the detected steering angle is not less than a given value,
wherein, when it is determined that the vehicle is in the middle of entering the curve or exiting from the curve, the detected steering angle is not filtered.

29. A method as in claim 28
wherein the given value is set within a range between 20 and 60 degrees per second.

30. A method as in claim 28,
wherein the given value is set within a range between 30 and 40 degrees per second.

31. A method for controlling orientation of a vehicle headlight axis, said method comprising:
detecting a vehicle steering wheel angle;
changing responsiveness in controlling the orientation of the headlight axis by filtering the detected vehicle steering wheel angle;
laterally swiveling the orientation of the headlight axis based on the filtered vehicle steering angle; and
determining that the vehicle is in a middle of one of (a) entering a curve and (b) exiting from a curve when an angle variation per unit time of the detected steering angle is not less than a given value,
wherein when it is determined that the vehicle is not in the middle of entering the curve or exiting from the curve, the detected vehicle angle is filtered using a given filter, and
wherein, when it is determined that the vehicle is in the middle of entering the curve or exiting from the curve, the detected vehicle steering angle is filtered using a certain filter, and
wherein using the certain filter enables responsiveness to be less slowed than using the given filter.

32. A method as in claim 31
wherein a presently detected steering angle refers to a present pre-filtering steering angle (STRA(j)), a presently filtered steering angle refers to a present post-filtering steering angle (STA(j)), and a previously filtered steering angle refers to a previous post-filtering steering angle (STA(j−1)),
wherein the present post-filtering steering angle STA(j) is specified using a filter constant (β) with a formula where STA(j)=β×STRA(j))+(1−β)×STA(j−1),
wherein the orientation of the headlight axis is laterally swiveled based on the present post-filtering steering angle (STA(j)), and
wherein the filter constant (β) is set within a range of more than 0.5 and less than 1.0.

33. A method as in claim 31
wherein the given value is set within a range between 20 and 60 degrees per second.

34. A method as in claim 31
wherein the given value is set within a range between 30 and 40 degrees per second.

* * * * *